United States Patent
Attenberg

[19]

[11] Patent Number: 5,913,019
[45] Date of Patent: Jun. 15, 1999

[54] DIRECT VIEW INTERACTIVE PHOTO KIOSK AND COMPOSITE IMAGE FORMING PROCESS FOR SAME

[75] Inventor: Samuel S. Attenberg, Washington, D.C.

[73] Assignee: Foto Fantasy, Inc., Windham, N.H.

[21] Appl. No.: 08/974,101

[22] Filed: Nov. 19, 1997

Related U.S. Application Data

[63] Continuation-in-part of application No. PCT/US97/00553, Jan. 22, 1997, which is a continuation-in-part of application No. 08/589,124, Jan. 22, 1996, Pat. No. 5,623,581.

[51] Int. Cl.[6] .................................................. G06K 15/00
[52] U.S. Cl. ........................................... 395/117; 395/106
[58] Field of Search ..................................... 395/101, 112, 395/109, 102, 117, 106; 345/433, 434, 435, 113, 114; 348/598, 584, 586; 707/527, 517, 520, 521, 522, 523; 382/294, 291; 358/450, 453, 464

[56] References Cited

U.S. PATENT DOCUMENTS

| | | | |
|---|---|---|---|
| 5,060,171 | 10/1991 | Steir | 345/435 |
| 5,345,313 | 9/1994 | Blank | 348/598 |
| 5,539,453 | 7/1996 | David, Jr. | 348/498 |
| 5,623,581 | 4/1997 | Attenberg | 395/106 |

Primary Examiner—Arthur G. Evans
Attorney, Agent, or Firm—Mintz, Levin, Cohn, Ferris, Glovsky and Popeo, P.C.

[57] ABSTRACT

An interactive photo kiosk in which, in one embodiment thereof, presents an upright open face which enables a user to stand directly in front of the kiosk, which optically defocuses the background image and substitutes a selected computer generated image, and which enables the user to pose and freeze a selected image made visible to the user on a display screen. Users may choose from among a menu of different computer generated background images. In a preferred embodiment, the selected frozen image is in digital form and is processed electronically to form a single digital multiple image of the same image in a selected area format which, when delivered to a printing apparatus for hard copy print-out, produces a multiple image of the same frozen image on a single sheet wherein each of the multiple images can be peeled off the single sheet and used separately from each other. An interactive image adjusting feature is provided to allow a user to modify the size and orientation of the user's image within the composite image. The composite image is formed by providing a uniform colored backdrop behind the user, imaging the user with the backdrop, and electronically replacing the backdrop color with the selected background image.

12 Claims, 10 Drawing Sheets

DIRECT VIEW INTERACTIVE PHOTO KIOSK AND COMPOSITE IMAGE FORMING PROCESS FOR SAME

CROSS-REFERENCE TO RELATED APPLICATIONS

This application is a continuation-in-part of International application Ser. No. PCT/US97/00553, filed Jan. 22, 1997, which is a continuation-in-part of prior application Ser. No. 589,124, filed Jan. 22, 1996, now U.S. Pat. No. 5,623,581.

BACKGROUND OF THE INVENTION

1. Field of the Invention

The present invention relates to photo kiosks of the type which are typically located in public access locations and which provide photographs to persons desiring the same who interact with the kiosk and to an image forming process for such kiosks. In the prior art, such kiosks were typically called "photo booths" and provided an enclosed area in which persons desiring a photograph of themselves could pose against a standard foreground while a photograph was taken and processed and delivered by the mechanisms of the photo booth. The end product of such prior art photo booths was typically a single image of the subject or separate multiple prints of the same image.

The present invention relates to an improved interactive photo kiosk in which a person desiring a photograph can pose directly in front of the kiosk to have a picture taken against a selected computer generated background or foreground and in which a multiple image format in the form of "stickers" on a single sheet is delivered to the user from a frozen image selected by the user. The present invention further provides a unique image forming process for combining the image of the user with the computer-generated background or foreground.

2. Background and Prior Art

Various types of photo kiosks are known in the prior art. In the early prior art, such photo kiosks were configured in the form of photo booths in which an enclosed or partially enclosed area was provided in which the subject or subjects could pose against a standard foreground fixed in the enclosed area while a photograph was taken. After the photograph was taken, the apparatus of the photo booth would process the photograph and deliver a finished print to the subject. Typically, the finished product was in the form of an image or, in some cases, additional separate prints of the same image could be obtained from the apparatus.

Other types of photo booths in the form of photo kiosks were also known in the art as the art evolved from the earlier photo booth structures. These later photo kiosks included various types in which the enclosed or partially enclosed area was eliminated and in which the subject could input a selected foreground image. However, such later photo kiosks have not been user friendly in the sense of providing an effective visually interactive interface with the user to enable consistently acceptable results under the full control of the user and being able to attract users with effective visual displays. In addition, the format of the finished product delivered to the user was in the form of a single image or in the form of additional and separate prints of the same image. This specific format of the finished product of such prior art apparatus has limited the use and appeal of such prior art photo booth apparatus.

SUMMARY OF THE INVENTION

The present invention provides an improved interactive photo kiosk which, in one embodiment thereof, presents an upright open face which enables a user to stand directly in front of the kiosk, which optically defocuses the background image and substitutes a selected computer generated image, which enables the user to pose and freeze a selected image made visible to the user using a power zoom with automated focus prior to the actual taking of a photograph, and which utilizes a touch screen to operate all functions from a displayed user friendly menu. Users may choose from among a menu of different computer generated background or foreground images and can pose and size themselves on a viewing screen as they like using the power zoom function. The viewing screen has a countdown timer which indicates the time remaining in which to pose before the image is frozen. If the user does not like the frozen image, the image can be unfrozen and re-posed with a new background or foreground if desired. Once a selected frozen image is selected, the kiosk apparatus delivers hard copy prints of the image within one to two minutes.

The improved kiosk of the present invention includes, in one embodiment thereof, a camera with internal power operated autofocus, auto iris, and zoom lens. The improved kiosk is also provided with a display screen visible to passersby to demonstrate and advertise the product to potential users. In another embodiment, the improved kiosk utilizes an extended internally folded optical path lengthening the camera to subject distance to enhance defocusing of the background image.

In a preferred embodiment of the present invention, the selected frozen image is in digital form and is processed electronically to form a single digital multiple image of the same image in a selected area format which, when delivered to a printing apparatus for hard copy print-out, produces a multiple image of the same frozen image on a single sheet wherein each of the multiple images can be peeled off the single sheet and used separately from each other. The peel apart images, referred to herein as "stickers," are preferably provided with a slightly adhesive backing so that they will stick and adhere to a surface to which they are applied According to another preferred embodiment of the invention, the image of the user may be selectively altered by the user with respect to the selected background image, to modify the appearance of the image of the user with respect to the selected background image.

According to a further aspect of the invention, a composite image of a user and a user-selected background is formed by providing a predefined colored backdrop against which the user poses in front of an electronic camera. The central processing unit or CPU of the kiosk system then replaces the colored background in the composite image with a user-selected background to form a composite image. The composite image is displayed on a CRT or equivalent display in real time, such that the user may strike a desired pose before choosing to "freeze" the composite image for printing.

Other features of the improved interactive kiosk of the present invention will be apparent from the following detailed description of preferred embodiments taken in connection with the accompanying drawings.

DETAILED DESCRIPTION OF THE INVENTION

Figure 1:
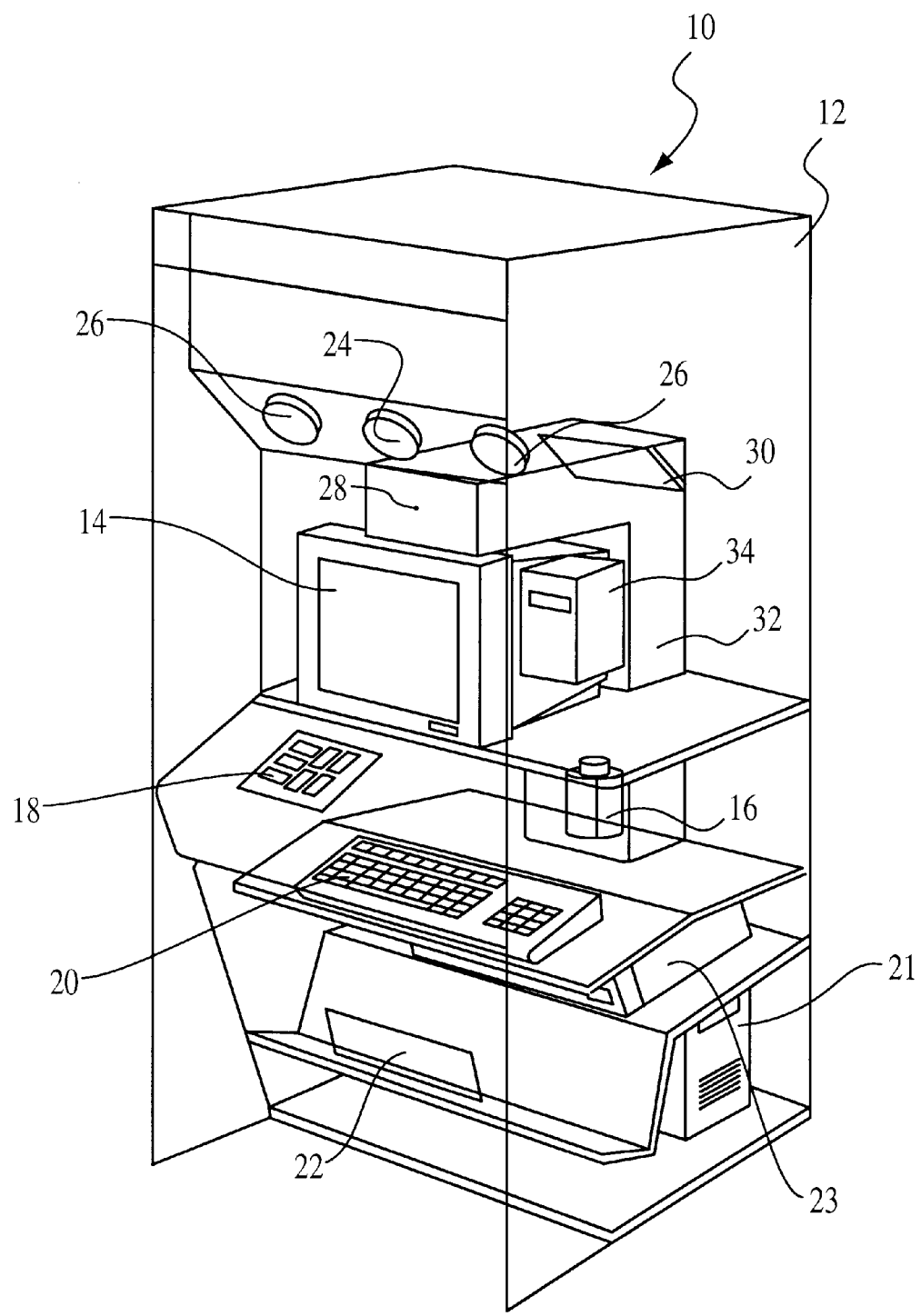
FIG. 1 is a perspective view of a direct view, interactive photo kiosk, shown with the internal components thereof visible, embodying the present invention.

Referring now to the embodiment shown in FIG. 1, a photo kiosk 10 is formed of an outer cabinet 12 containing a monitor 14, a camera 16, a keypad 18, a keyboard 20, a CPU 21 and a delivery chute 22 for delivering the finished product from a printer 23. The kiosk 10 also contains a speaker 24 for delivering instructions to a user and lights 26 for lighting the subject to be photographed. A folded optical path is provided from a view tunnel opening 28 reflecting from an optical mirror 30 to the camera 16. The folded optical path is enclosed in a casing 32. The camera 16 is an electronic camera which produces a digital image and which is preferably provided with an internal power autofocus, auto iris, and zoom lens.

Passers-by see a scrolling sales attract loop which is displayed on the monitor 14 which demonstrates the process of the apparatus and which displays on the screen the finished product, which is a sheet of peel-off stickers as shown in one form in FIG. 5 and which will be explained later in detail. A subject wishing to use the kiosk 10 stands directly in front of the apparatus and interacts with the keypad 18 and keyboard 20 to operate the apparatus from a menu displayed on the monitor 14 and delivered by stored voice instructions delivered through the speaker 24. One of the functions of the keyboard 20 is to provide the owner/operator of the kiosk access to the software program that controls the processes of the system and to an integral accounting, audit and security encryption file that allows the owner/operator to verify cash receipts by image choice, by day, month and annually, and cumulatively, as well as access to the use of a materials tracking record of users entering the system through its password system, and an out-of-service record showing the various error files and the time and duration of each error and the time when the error was corrected.

Figure 3:
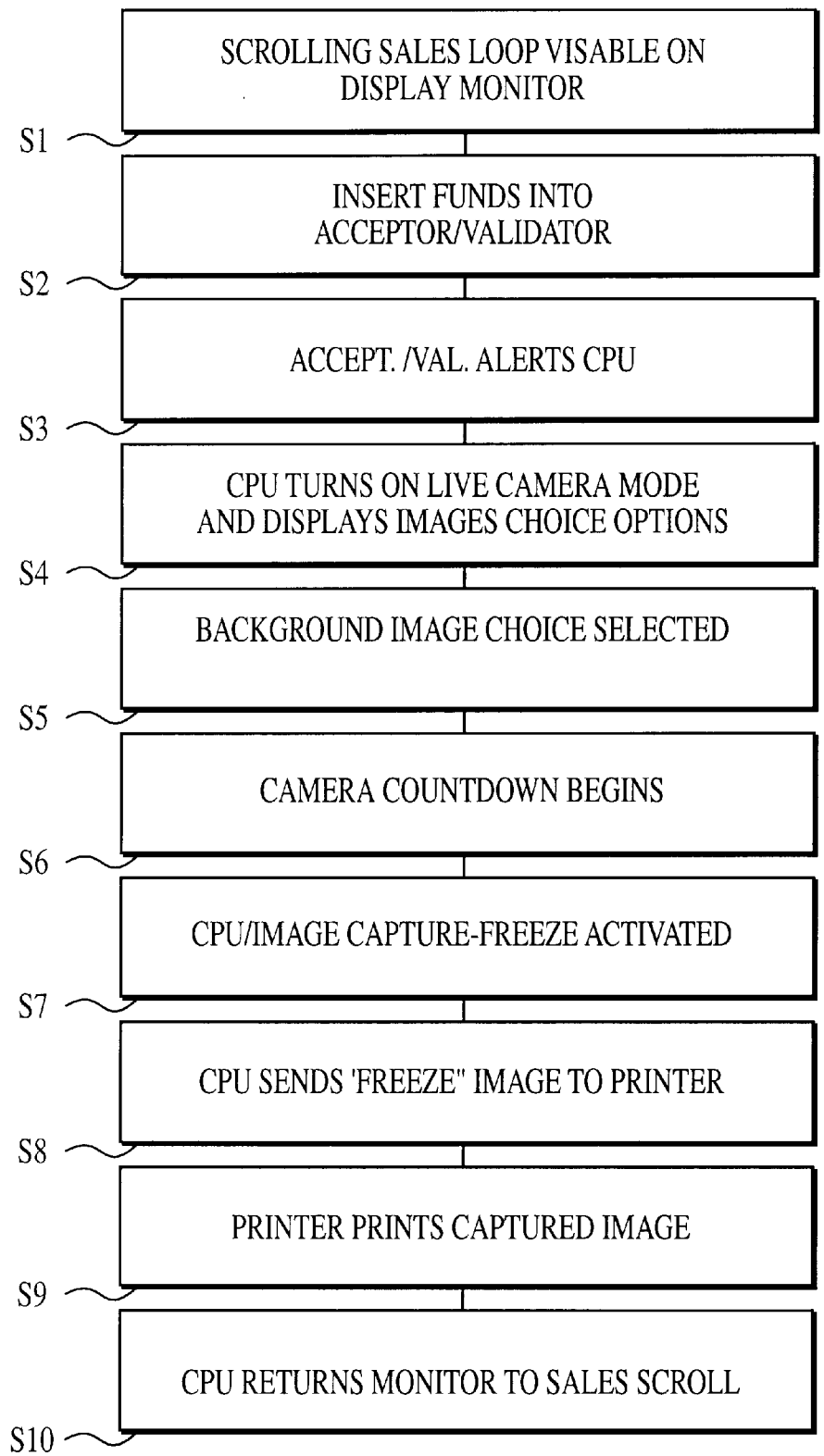
FIG. 3 is a flow chart showing the process and sequence of operation of the embodiments of FIGS. 1 and 2.

The sequence of operation of the system by users of the system is shown in FIG. 3 starting with the scrolling sales loop at step S1.

The user is invited to use the apparatus by inserting a currency bill into a bill validator 34, which may also contain a slot 36 for accepting credit/debit cards. Other forms of accepting payment may also be provided. After payment has been made (step S2 in FIG. 3) and accepted, the system alerts the CPU 21 at step S3 and the CPU turns on the live camera mode and displays the image choice options at step S4. The keypad 18 is configured to allow order commands to be entered by the user to the computer interface based on menu choices displayed on the monitor 14.

After the initial activation of the system, the available choices for background images to be electronically inserted on the image of the subject are displayed on the monitor 14 in the form of numbered windows, each numbered window representing a choice that may be selected by the user as a background for the pose. In the embodiment of FIG. 1, typically about sixteen different image backgrounds are displayed on the screen for selection by the user by designating the number of the window of the desired image background.

Instead of providing for selection of the choices by using the keypad 18, the numbered windows may be displayed on the monitor 14 in the form of a touch display which enables the user to select the desired window number by touching one of the windows displayed on the monitor. When the window of choice is selected at step S5 in FIG. 3, either by using the keypad 18 in the non-touch screen version or by touching the selected window on the screen in the case of a touch screen, users see themselves on the full screen with the selected background image. The screen also displays instructions directing the users to size themselves with the power zoom function and to pose themselves as they like. The screen also displays at step S6 a count-down timer indicating the time remaining before a pose is frozen by the recording of a digital image at step S7.

After the image is freeze-captured at step S7, the frozen image is displayed on the monitor 14 for viewing by the user. At this point, the user may be given the option of unfreezing the stored image and of choosing another pose or another background image if the user desires to do so. Once the final capture-freeze is activated at step S7, the CPU 21 sends the frozen image to the printer at step S9 for processing as illustrated in FIG. 4 and the printer then prints the captured image for delivery to the user at step S9, after which the system returns to the monitor sales scroll at step S10.

Figure 4:
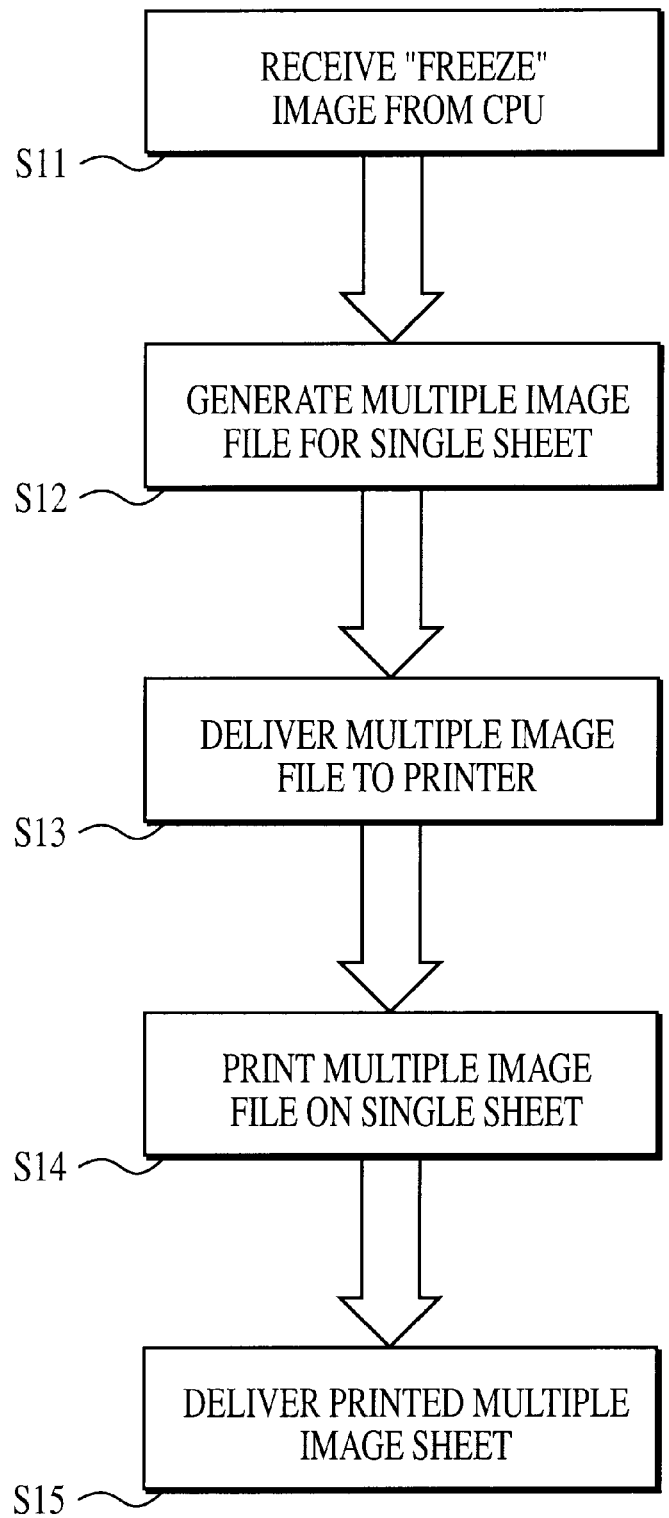
FIG. 4 is a flow diagram showing in further detail certain the steps of the process of FIG. 3 for printing multiple images.

Step S9 is illustrated in further detail in FIG. 4 in which steps S11 through S15 show the steps carried out at the printer in accordance with the present invention and represented by step S9 of FIG. 3. At step S11 in FIG. 4, the "freeze" image is received from the CPU 21. In step S12, the electronic digital image received from the CPU is processed into a new electronic digital file containing multiple images of the single frozen image in a format suitable for printing on a single sheet from the sensitized sheets stored in the printer 23.

The printer 23 is preferably a thermal dye sublimation printer which produces an image by thermal activating of dyes in image receiving sheets stored in the printer. Such thermal dye sublimation printers are well known in the art and the operation thereof will therefore not be further explained here. Other types of printers capable of producing a hard copy print from a digitally stored image may also be used in the apparatus of the present invention.

After the multiple image file is generated in step S12, the file so generated is delivered to the printer 23 in step S13 and the multiple image file is printed on a single sheet in step S14 and delivered as the finished product in step S15.

Figure 5:
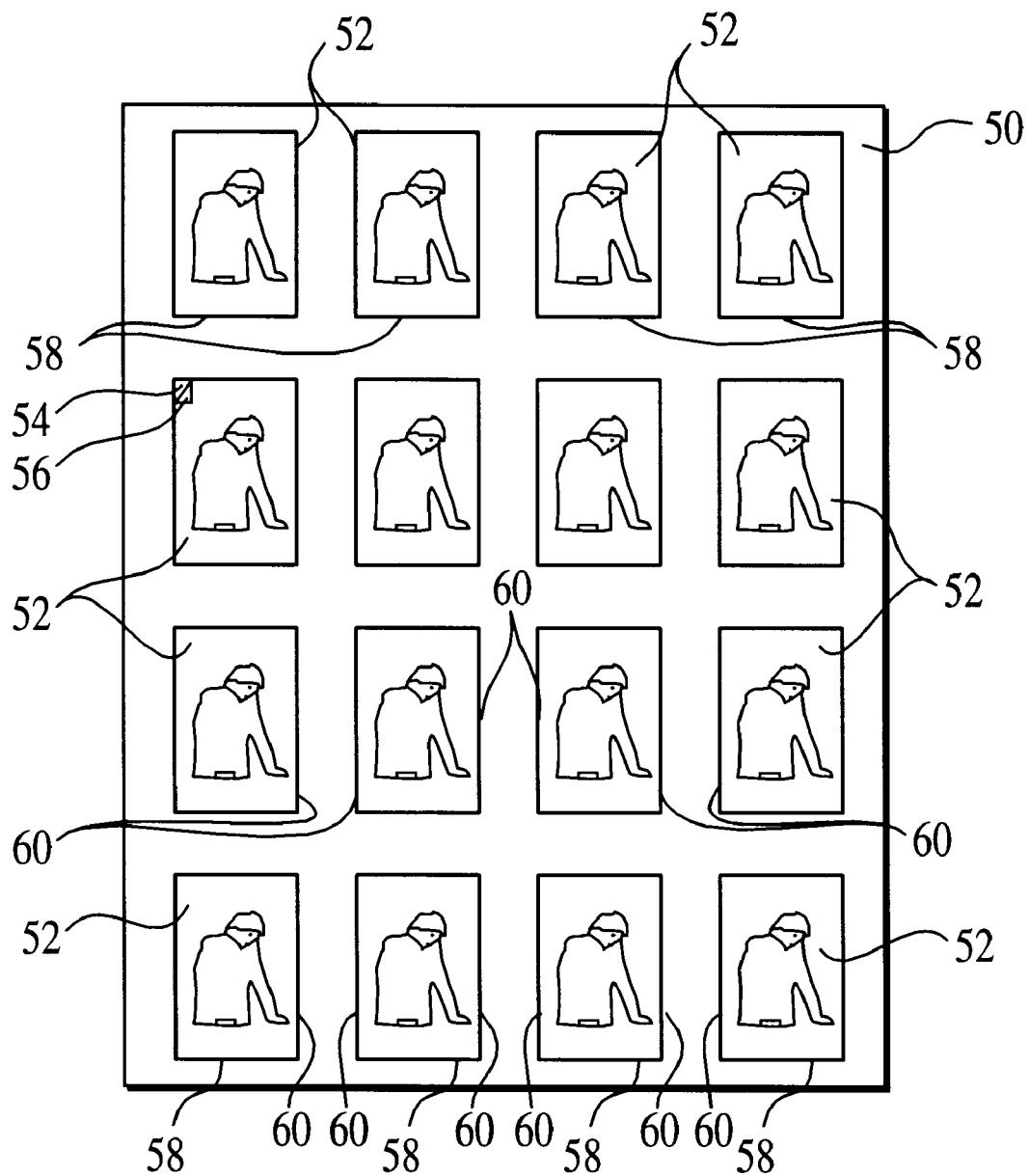
FIG. 5 is an illustration of the finished product of the preferred embodiment of the apparatus and method of the present invention in the form of a multiple image format with images formed on peel apart stickers.

The finished product, as shown in FIG. 5., comprises a single multilayered sheet 50 with multiple images 52 of the single frozen image formed thereon by the printer 23. In the embodiment shown in FIG. 5, sixteen identical rectangular images are shown on the single sheet, but any number can be selected and the images may be arranged in any form. That is, the multiple image file generated in step S12 of the process shown in FIG. 4 may be arranged in any format for printing on a single sheet.

The image containing sheet 50 of the embodiment of FIG. 5 is a multilayered sheet in the form of a base sheet 54, which is visible at the point where one of the images is shown partially peeled back from the base sheet 54, and an image bearing sheet 56 (shown as the partially peeled back portion). The image bearing sheet 56 is scored along horizontal lines 58 and vertical lines 60 defining the image areas so that the individual images 52 are removably secured to the base sheet 54 and can be separately peeled off from the base sheet 54 and removed in that manner. The image bearing sheet 56 is lightly adhered to the base sheet 54 so that images so removed retain some adhesive on the back surface thereof and can thus be adhered to surfaces to which they are applied.

The multiple image "stickers" so produced have a variety of uses and may be used in various forms of identification documents and the like, for example. The term "stickers", as used herein, refers to peel apart images on a base sheet, such as the images 52 on the base sheet 54, and the term "sticker sheet" refers to the overall assembly of the removable stickers and the base sheet as shown in FIG. 5.

In the embodiment of the invention as shown in FIG. 1, the folded optical path which extends from the subject through the view tunnel opening 28 and the optic mirror 30 to the camera 16 results in the attainment of a narrow depth of field at the range of the subject with resultant complete defocusing of the background image around the subject. The apparatus is also configured so that the subject can stand directly in front of the kiosk and can view the image directly on the monitor 14 while manipulating the controls of the apparatus. The apparatus therefore takes up very little floor space and at the same time affords flexibility and ease of use to a subject in forming a suitable pose for the desired image composition. The lights 26 can also be more precisely arranged to provide lighting to the region in which the subject will stand while operating the controls and posing for the desired image composition. The advertising message which is scrolled and displayed on the monitor 14 is also highly visible to passers-by from the open face of the kiosk.

Figure 6:
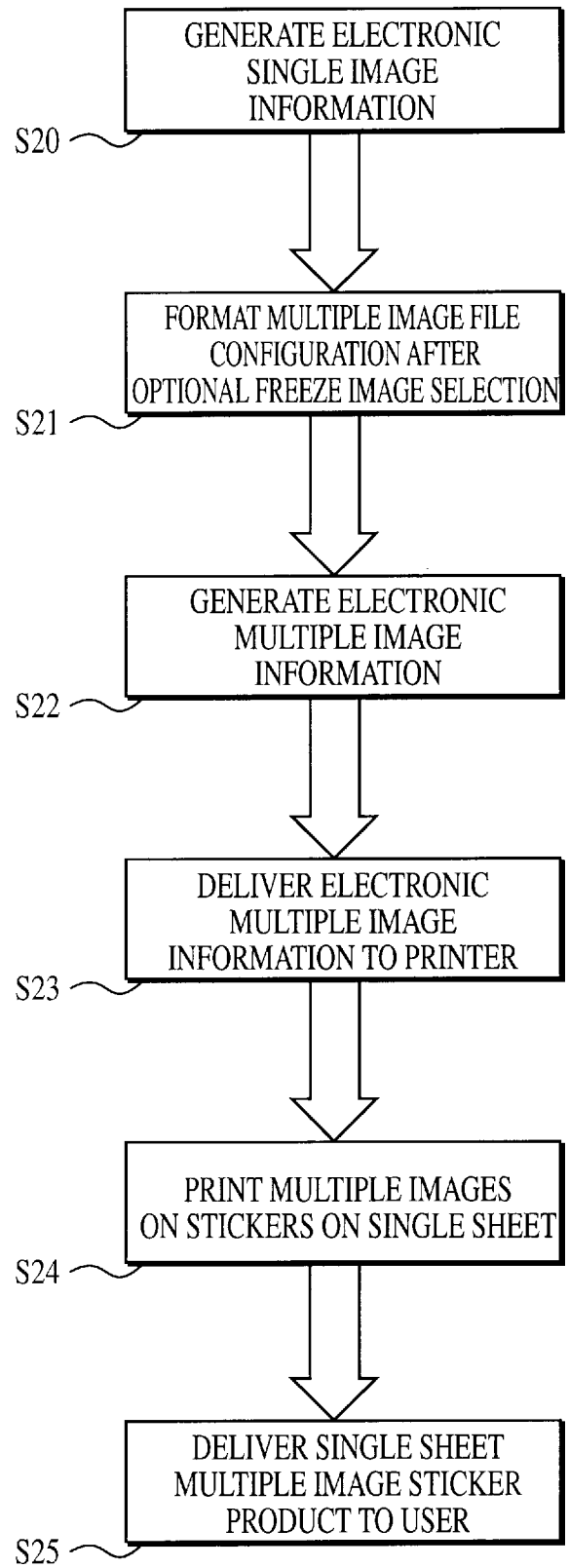
FIG. 6 is a flow diagram showing the overall process of a preferred embodiment of the present invention.

The overall method of the present invention is shown in the flow diagram of FIG. 6. The method begins with the generation of electronic single image information in step S20. This takes place at the camera 16 which, as described above, is an electronic imaging device which creates an electronic file, usually in the form of digital data, which is representative of the single image projected onto the imaging screen of the camera 16. This step includes the electronic incorporation into the image of the user of a background image selected by the user from among the multiple background images presented on the display 14. For example, the user may desire to be posed with the background image of a selected historic building or monument or with a floral background image. Electronic processing techniques for generating first electronic image information from a projected image and for electronically incorporating a background image into the first electronic image information are well known in the art and will not be further described here.

In step S21, a multiple image format is selected for formatting the electronic single image information into a multiple image file configuration in which multiple images identical to the single image are arranged in a selected pattern such as shown in FIG. 5. Step S21 may also preferably include, as a preliminary step before the multiple image file configuration is formatted, the presentation of a "freeze image" to the user on the viewing screen of the display 14 for review by the user and for selection by the user for hard copy print out if the freeze image is deemed acceptable. If the freeze image is not deemed acceptable by the user, the image may be discarded and the process may be recycled from the beginning to create a new freeze image for selection by the user. In step S22, electronic multiple information is generated by electronic processing in the format selected in step S21, whereby electronic multiple image information capable of controlling a printer to print multiple images on a single sheet is produced.

Techniques for electronically formatting and generating the electronic multiple information from the electronic single image information as illustrated in steps S21 and S22, such that a printer will print out multiple images of the same image on a single sheet, are well known to those skilled in the art.

In step 23, the electronic multiple image information is delivered to the printer and, in step S24, the multiple images are printed out on stickers on a single sheet in the format as generally shown in FIG. 5. It is to be understood that the number of images selected for printing out on a single sheet may vary from that shown in FIG. 5 and that the arrangement of the images selected may be in any desired pattern.

In step S25, the finished product in the form of a sheet of image stickers, such as shown in FIG. 5, for example, is delivered to the user. The finished product is delivered automatically through the delivery chute 22 in the embodiment shown in FIG. 1. The entire process is carried out while the user waits and, in the embodiment shown in FIG. 1 using the process of the invention as described above, the finished product can be delivered in less than two minutes, typically in about 80 seconds or so.

Although the presentation of the freeze image to the user is shown in the embodiment of FIGS. 4 and 6 at a point preliminary to the generation of the electronic multiple image information in step S12 in FIG. 4 and in step S22 in FIG. 6, the presentation of the freeze image for viewing by the user may be carried out at any point in the process after the selection by the user of the desired background image and prior to the actual hard copy print out of the multiple image single sheet final product. However, in the embodiment utilizing the methods as set forth in the flow diagrams of FIGS. 4 and 6, the freeze image is not generated until after the user has selected the desired background image since the selected background image is incorporated in the electronically generated image which is presented to the user for freezing if deemed acceptable.

Figure 2:
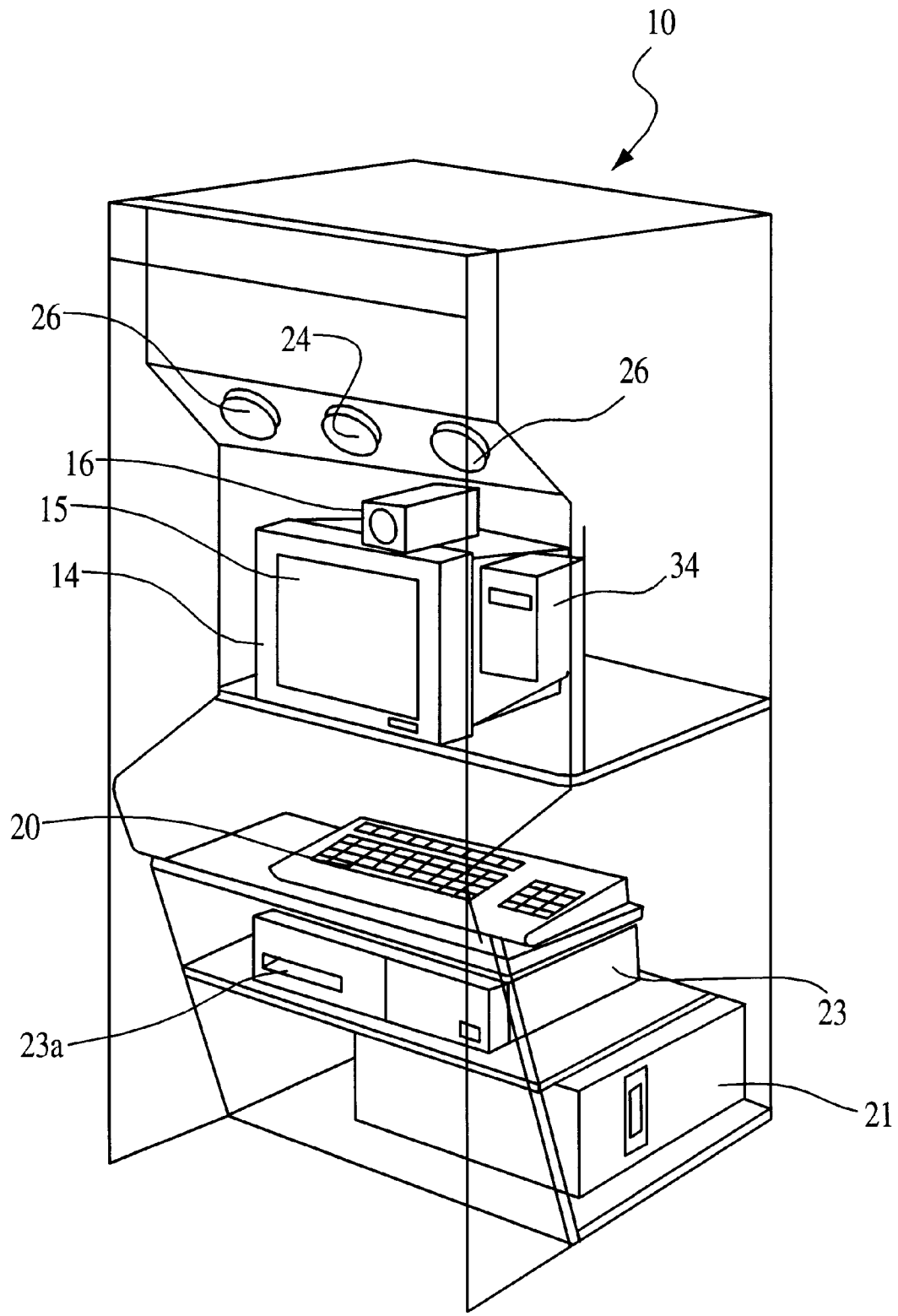
FIG. 2 is a perspective view of another embodiment of the present invention in the form of a direct view, interactive photo kiosk.

Another embodiment of the invention is shown in FIG. 2. In this embodiment, the components of the kiosk 10 are arranged differently from those shown in the embodiment of FIG. 1. In the embodiment of FIG. 2, the same reference numerals are used to designate elements which are the same as those utilized in the embodiment of FIG. 1.

In this embodiment, the camera 16 is positioned directly over the monitor 14 and the extended optical path of the embodiment of FIG. 1 has been eliminated. The keypad 18 of the embodiment of FIG. 1 has also been eliminated and the functions performed have been installed in a touch screen 15.

In the embodiment of FIG. 2, the user can select the desired background image from among the different background images displayed in numbered windows on the touch screen 15 by touching the window containing the desired background image. The specific and overall methods performed by the embodiment of FIG. 2 are the same as those shown and described in FIGS. 3, 4 and 6 and the preferred end product is the same as that shown in FIG. 5.

Figure 7:
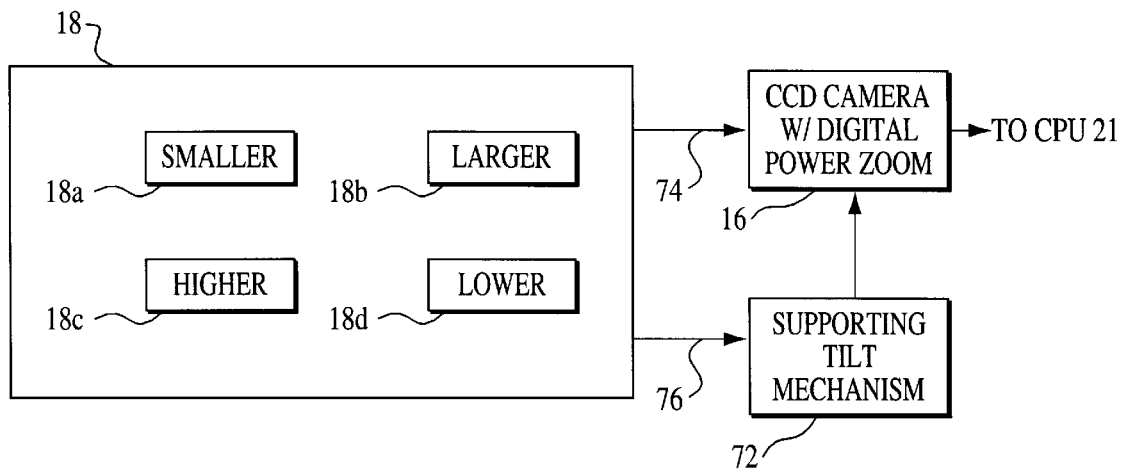
FIG. 7 is a block diagram showing a first alternate embodiment of the invention in which the user of the system may selectively alter the appearance of the user's image being printed.

A first alternate embodiment of the invention is shown in FIG. 7. In this alternate embodiment, the user is able to vary the appearance of his or her image vis-a-vis the selected background image. Specifically, the keypad 18 is provided with four image adjustment keys 18a–18d, wherein key 18a provides a command signal for making the image smaller, key 18b provides a command signal for making the image larger, key 18c provides a command signal for making the image higher, and key 18d provides a command signal for making the image lower. The camera 16, which preferably is a CCD (Charge Coupled Device) camera with digitally controlled power zoom feature, is mounted on a supporting tilt mechanism 72. The camera 16 receives command signals from the keypad 18 through signal line 74, and the tilt mechanism 72 receives command signals from the keypad 18 through signal line 76.

In operation, when a user desires to make herself appear smaller in the image displayed on the monitor 14, she presses the key 18a. This causes a corresponding command signal to be sent to the camera 16 through line 74, which causes the zoom mechanism to "zoom out" and thereby make the image of the user appear smaller on the monitor 14. Similarly, if the user desires to make herself appear larger in the displayed image, she presses key 18b, which causes a corresponding command signal to be sent to the camera 16 which causes the zoom mechanism to "zoom in" on the user, making her image larger.

If the user wishes to make herself appear higher or lower in the image vis-a-vis the displayed background, she presses the respective keys 18c or 18d. Actuation of these keys causes corresponding command signals to be sent to the tilt mechanism 72, which functions to tilt the camera 16 down or up, respectively, so that the user's image appears higher or lower in the reference frame of the monitor 14.

After the user is finished adjusting the image, she may strike a pose and activate the image freeze function, which will cause the image to be "captured" and stored in memory for further processing and printing.

Figure 8:
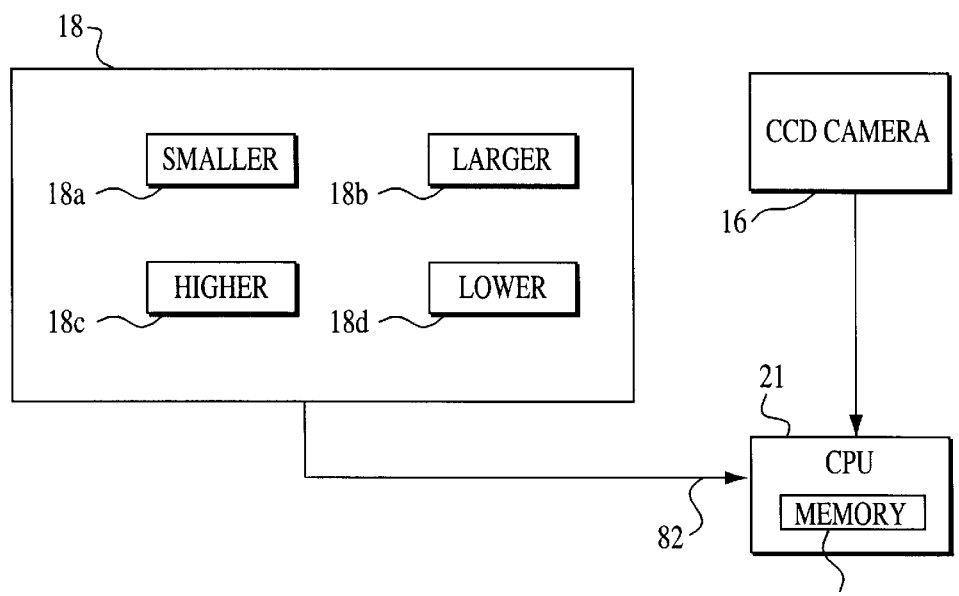
FIG. 8 is a block diagram showing a second alternate embodiment of the invention in which the user of the system may selectively alter the appearance of the user's image being printed.

FIG. 8 shows a block diagram of a second alternate embodiment for user interactive image adjustment. In this embodiment, the zoom feature and tilt mechanism are replaced by an electronic imaging process. According to this embodiment, the image from the camera 16 is sent to the CPU 21 and is stored in a memory 21a associated with the CPU 21. Upon receipt of a command signal from the keypad 18 through signal line 82, the CPU 21 determines what command has been sent by the content of the signal, i.e., whether the command is to make the user image smaller, larger, higher or lower in the composite image. Upon determining the command, the CPU may execute an image processing program to digitally manipulate the user image data stored in memory 21a in order to obtain the desired adjustment. The modified image data is then sent to the monitor 14 for viewing by the user. According to this embodiment, the user may adjust the image appearance after activating the image freeze capture function which causes the instantaneous image data from the camera 16 to be sent to the CPU and stored in memory. While the embodiments of FIGS. 7 and 8 have been described with respect to use of keys on a keypad 18, the image modifying keys equivalently may be implemented on a touch sensitive screen as referred to above.

A further embodiment of the invention will now be described with reference to FIGS. 9A–9B and 10. According to this embodiment as shown in FIG. 10, a colored backdrop 112 is provided at a predetermined distance from the camera and display of the kiosk 10, such that a user stands between the backdrop 112 and the camera 16. The backdrop can be attached to the cabinet 12 of the kiosk 10 by using a pair of cantilevered support rods 114 as shown, or may be positioned in front of the camera 16 by any other equivalent mechanism. The surface of backdrop 112 facing the camera is of a predefined, uniform color, such as blue.

Figure 9A:
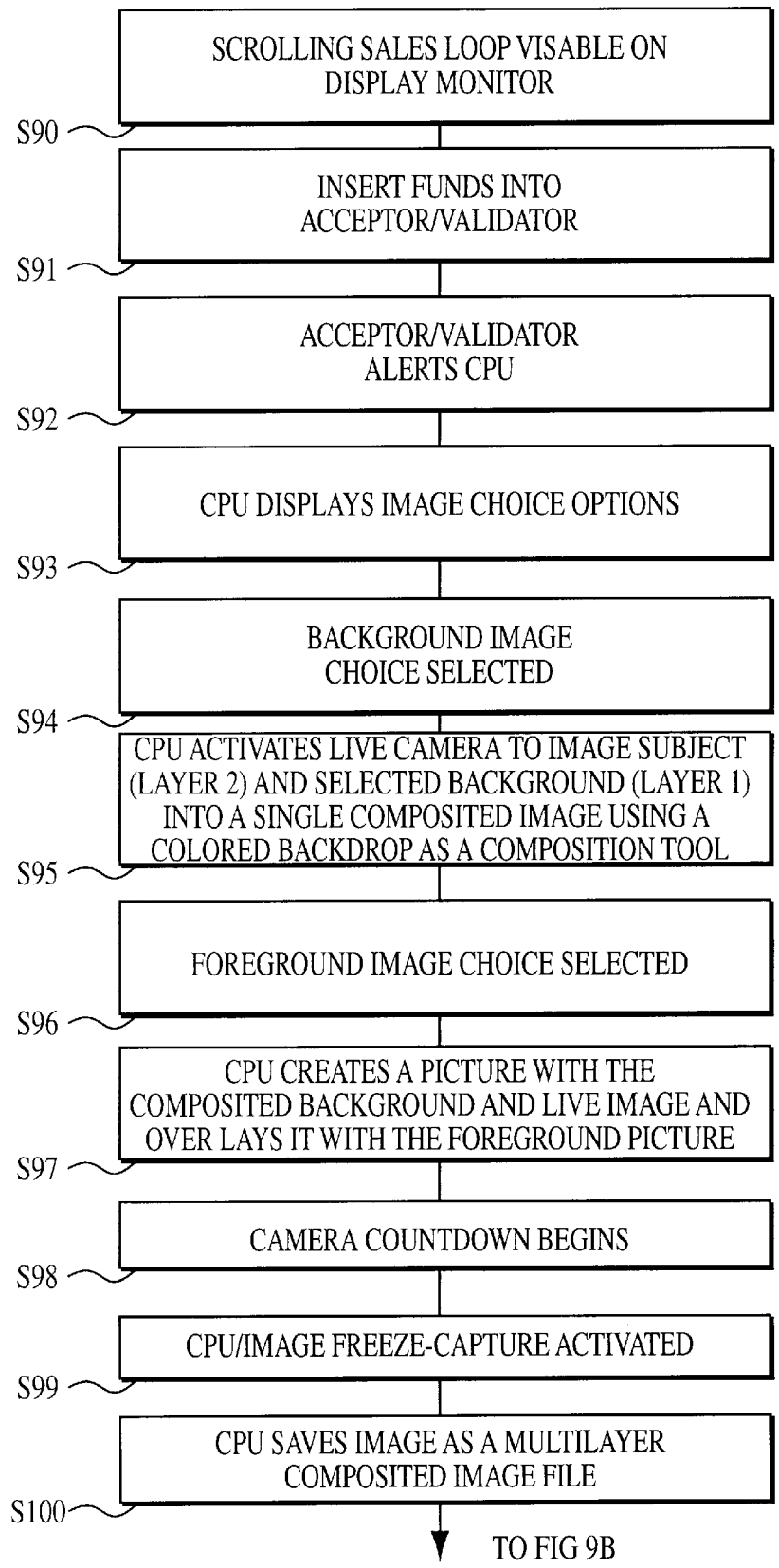
FIGS. 9A and 9B are flow diagrams illustrating the chroma-keyed composite image forming process according to a further embodiment of the invention.
Figure 9B:
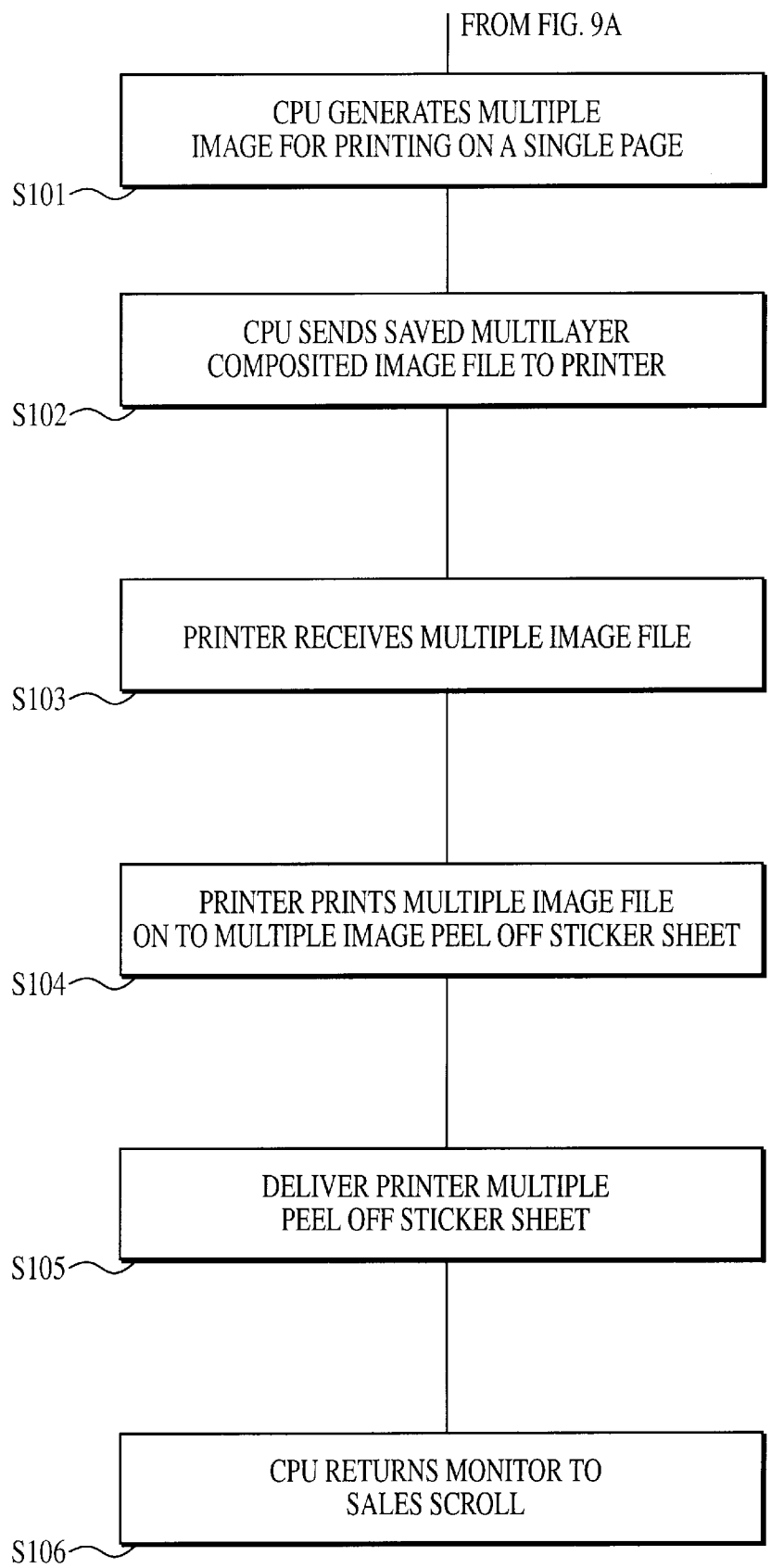
Figure 10:
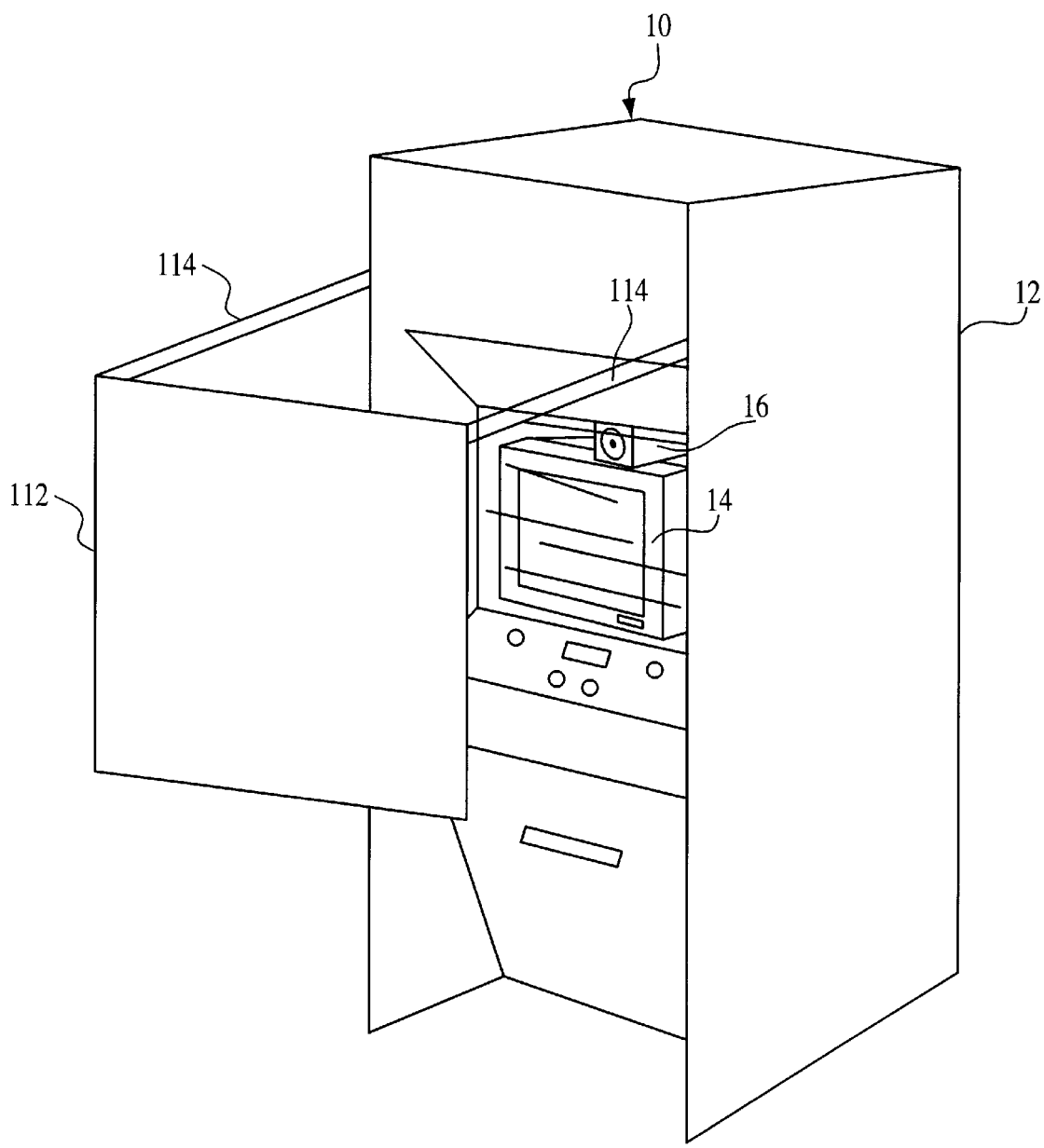
FIG. 10 is a perspective view of a photo kiosk including a colored backdrop for the chroma-keyed image formation process according to the present invention.

Referring to FIGS. 9A and 9B, the operation of this further embodiment will now be described in detail. At step S90, the kiosk is in a standby mode during which a scrolling attraction loop is played on the display monitor 14. At S91, a user initializes the interactive mode of the system by inserting the correct amount of funds into the currency acceptor/validator. The validator then sends a signal to the CPU at step S92 indicating that the CPU should start the interactive mode of operation. In response, at S93, the CPU displays a number of background image choice options. At S94, the user selects a desired background image from the displayed options, either using keys or by touching a touch sensitive display screen.

Once the selected background image is chosen, at step 95 the CPU activates the camera 16 to image the user and the colored backdrop 112, wherein the colored backdrop is used as an image composition tool to create a composite image of the user and the selected background, by digitally replacing the backdrop color with the selected background image. This is accomplished by defining the user as one layer (layer 1) and the backdrop color as another layer (layer 2), and substituting the selected background image for layer 2. At step S96, a user may optionally also select a foreground image from a number of displayed foregrounds, and at step S97, the CPU overlays the selected foreground image with the composited live image of the user and the selected background. In the case that no foreground is desired or provided, steps S96 and S97 may be eliminated.

At step S98, a countdown is begun to allow the user a period of time during which to adjust his/her pose, facial expression, and image orientation, before an image is "frozen." At step S99, the image on the display is captured or frozen by the CPU, either as a result of a timeout in step S98 or in response to the actuation of an image freeze button by the user. At step S100, the CPU saves the captured image as digitized information. At step S101, the CPU generates a multiple image file from the saved captured image, for printing on a single sheet. At S102, the CPU sends the multiple image file to the printer, which is received by the printer at step S103. Next, at S104 the printer prints the transmitted multiple image file to a single sheet of multiple peel off sticker material. The finished printed sheet is then delivered to the user at step S105, and the CPU then returns to the scrolling attract loop at step S106.

The photo kiosk apparatus and method of the present invention thus present a user friendly direct view, menu driven interface which is easy to operate and which give results which can be composed and edited in advance of actual hard copy print out and which further provide a unique end product in the form of a sticker sheet with removable image stickers having multiple uses. The term "direct view" as used herein to describe the photo kiosk of the present invention, refers to the open face presented by the kiosk with respect to the user wherein the viewing screen, the opening of the optical path from the camera to the region for provided for the user to pose at the kiosk, and the associated keyboard and other operating controls, such as the touch screen features on the viewing screen, are all arranged directly in front of and interfacing with the user in an open and unenclosed space directly in front of the apparatus. The term "freeze image" as used herein refers to an electronically stored image which is displayed on the screen for viewing by the user prior to the selection of the image for hard copy print out by the printer.

It is to be understood that the embodiments of the apparatus and methods presented herein are shown and described for the purposes of making a full disclosure of the preferred embodiments and that the embodiments presented are thus not limiting in any way as to the scope of the present invention as defined in the appended claims.

What is claimed is:

1. A photo kiosk for automatically taking, processing and delivering to a user in response to user-activated commands photographic images of the user posed at the photo kiosk comprising:

a backdrop formed of a single preselected color positioned at a distance from said kiosk so as to be located behind the user posed at said kiosk as a color background;

an electronic imaging device for electronically forming first electronic imaging information representative of an image of the user-and said color background posed in a region provided at the photo kiosk for the user to pose;

means for providing at least one selected background image;

means for replacing said background color in said first electronic imaging information with said selected background image to form second electronic imaging information;

display for displaying an image represented by said second electronic imaging information;

a printer for printing out hard copy images responsive to electronic imaging information delivered thereto;

means for delivering said second electronic imaging information to said printer for printing out from said printer hard copy images represented by said second electronic information; and delivery means for automatically delivering to said user said hard copy images.

2. A photo kiosk as set forth in claim 1 in which said display comprises a touch sensitive screen for enabling the user to make a selection of a selected image of the user and an image background by touching a selected portion of the touch screen.

3. A photo kiosk as set forth in claim 1, further comprising means for processing said second electronic imaging information to form third electronic imaging information representative of multiple images of the image represented by said second electronic imaging information;

said multiple images being arranged in a preselected pattern for being printed by said printer as a hard copy on a single sheet.

4. A photo kiosk as set forth in claim 3, wherein said third electronic information is printed out from said printer on a single multilayer hard copy sheet;

said single multilayer hard copy sheet being formed of a base sheet layer and an imaging sheet layer which are removably adhered together and formatted such that each of said multiple images can be separately peeled off from said supporting base sheet layer on which all of said multiple images are adhesively secured.

5. A photo-kiosk as set forth in claim 1 further comprising means for selectively modifying said electronic imaging information displayed on said display so as to alter the size and/or orientation of the image of the user represented by said electronic imaging information as displayed on said display according to commands selected by said user.

6. A photo kiosk as set forth in claim 1, further comprising means for attaching said backdrop to said photo kiosk.

7. A photo kiosk as set forth in claim 1, further comprising means for providing at least one selected foreground image, and means for overlaying said selected foreground image with said second electronic imaging information to form an overlaid composite image and providing said overlaid composite image to said printer for printing as a hard copy.

8. A method for automatically taking, processing and delivering to a user in response to user-activated commands photographic images of the user posed at a photo kiosk, comprising the steps of:

providing a backdrop formed of a single preselected color positioned at a distance from said kiosk so as to be located behind the user posed at said kiosk as a color background;

forming first electronic imaging information representative of an image of the user and said color background posed in a region provided at the photo kiosk for the user to pose;

providing at least one selected background image;

replacing said background color in said first electronic imaging information with said selected background image to form second electronic imaging information;

displaying an image represented by said second electronic imaging information;

printing out hard copy images represented by said second electronic information; and automatically delivering to said user said hard copy images.

9. A method as set forth in claim 8, further comprising the step of processing said second electronic imaging information to form third electronic imaging information representative of multiple images of the image represented by said second electronic imaging information;

said multiple images being arranged in a preselected pattern for being printed as a hard copy on a single sheet.

10. A method as set forth in claim 9, wherein said third electronic information is printed out on a single multilayer hard copy sheet;

said single multilayer hard copy sheet being formed of a base sheet layer and an imaging sheet layer which are removably adhered together and formatted such that each of said multiple images can be separately peeled off from said supporting base sheet layer on which all of said multiple images are adhesively secured.

11. A method as set forth in claim 8 further comprising the step of selectively modifying said electronic imaging information displayed on said display so as to alter the size and/or orientation of the image of the user represented by said electronic imaging information as displayed on said display according to commands selected by said user.

12. A method as set forth in claim 8, further comprising the step of providing at least one selected foreground image, and the step of overlaying said selected foreground image with said second electronic imaging information to form an overlaid composite image and providing said overlaid composite image for printing as a hard copy.

* * * * *